June 19, 1956  J. B. SALMINEN  2,750,592
WELDING MASK
Filed June 20, 1952
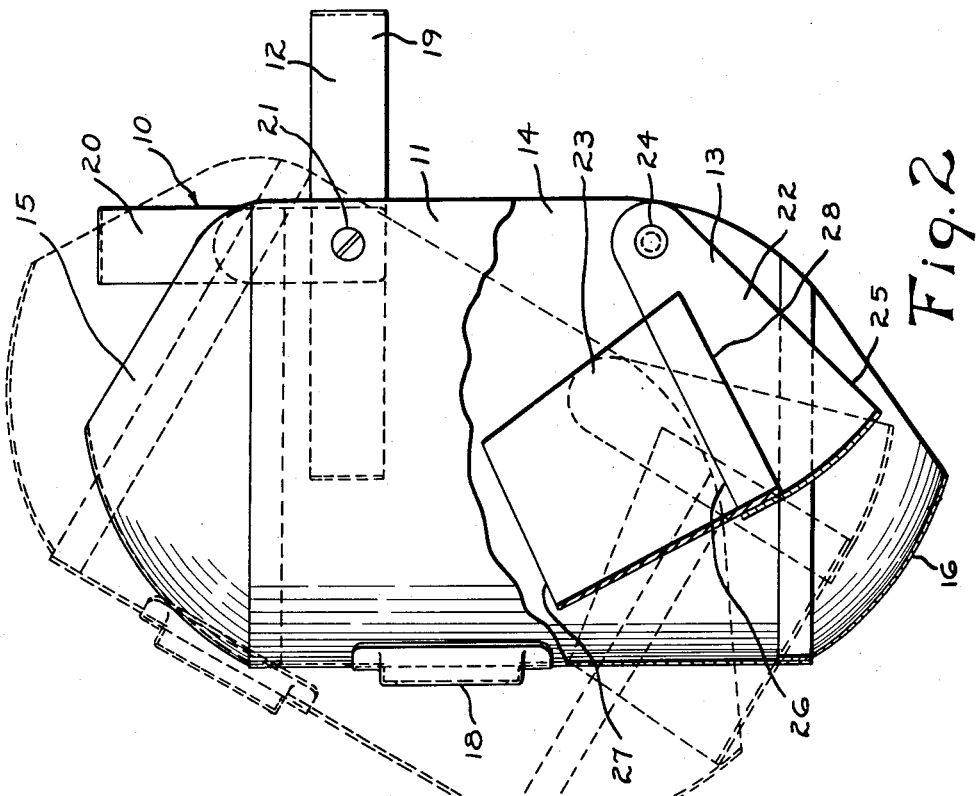
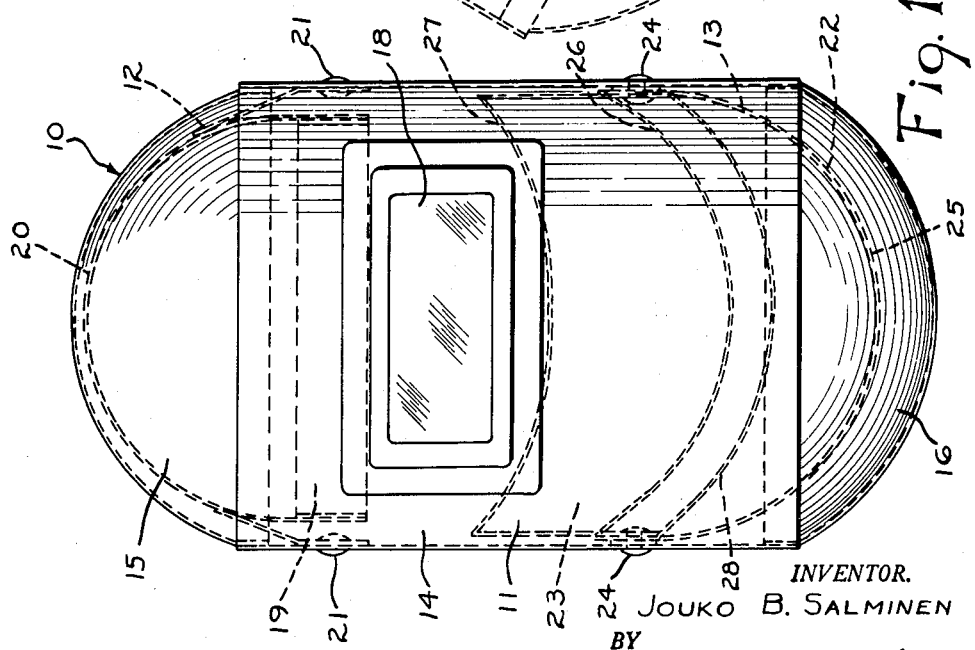
INVENTOR.
JOUKO B. SALMINEN
BY
Norman S. Blodgett
ATTORNEY

United States Patent Office 2,750,592
Patented June 19, 1956

2,750,592
WELDING MASK

Jouko B. Salminen, Leicester, Mass.

Application June 20, 1952, Serial No. 294,566

6 Claims. (Cl. 2—8)

This invention relates to welding masks and more particularly to a protective covering for the face and eyes of a welder during the numerous dangerous operations connected with the welding of metal.

Masks have been used in the welding art for the protection of the worker ever since welding began. In most cases these masks consist of a harness fitting the head tightly and a shield which is hingedly attached to the harness. The shield is formed to fit around the face of the wearer and has a semi-opaque window which registers with the eyes of the user. After the welder has formed a bead, it is necessary for him to inspect it and to chip away scale and irregular metal formations. Since the window is deeply colored for use with the intense light of the welding flame or arc, it is not possible to perform this operation while looking through this window. It is, therefore, the usual practice for the welder to push the shield upwardly and to look under the lower edge thereof. Since the weld is still hot, it may continue to give off sparks and, of course, the chipping operation may send hot particles of metal flying in the direction of the welder's face. This has frequently resulted in injury to the welder, particularly because of sparks and the like which land in his eyes. The present invention obviates these difficulties experienced in the past in a novel manner, as will be evident from the description.

It is therefore an outstanding object of the present invention to provide a welding mask which permits the welder to examine a newly-made weld and to clean the weld without danger to his eyes.

Another object of the invention is the provision of a welding mask having a transparent guard for use when the mask is raised, which guard does not interfere with the normal use of the mask.

A further object of this invention is the provision of a transparent guard for use with an ordinary welding mask, which guard resides in an inoperative position within the mask during normal use thereof.

A still further object of the present invention is the provision of a welding mask which does not permit exposure of the welder's eyes to the work at any time during any time in the welding cycle.

Although the novel features which are characteristic of this invention will be particularly pointed out in the claims appended hereto, the invention itself, as to its objects and advantages, the mode of its operation and the manner of its organization will be better understood by referring to the following description taken in connection with the accompanying drawings forming a part thereof, in which:

Figure 1 is a front elevational view of a welding mask embodying the present invention, and Figure 2 is a side elevation of the welding mask with portions broken away.

Referring to the drawings, the welding mask, generally designated by the reference character 10, comprises a hood 11, a head harness 12, and a guard 13. The hood 11 is formed of a hard, opaque sheet material and is composed of a generally tubular main portion 14, an upper portion 15 which has the shape of a spherical segment, and a lower portion 16 which also resembles a spherical segment. The forward upper part of the main portion 14 is provided with a window 18 formed of a semi-opaque substance, such as colored glass, which prevents the passage of any light except the intense light of the welding flame or arc. The head harness 12 is composed of an adjustable circular band 19 and a semicircular band 20 secured thereto and extending thereacross to prevent downward movement of the harness on the welder's head. The harness 12 is hingedly connected to the rearward upper part of the main portion of the hood by means of hinges 21; the friction between the moving parts of the hinges is adjustable by screw means, so that the welder is able to introduce enough resistance to relative movement into the hinge to permit the body portion to remain at any desired angular position with respect to the harness and the welder's head.

The guard 13 consists of a portion 22 which is in the form of a spherical segment and portion 23 which is in the form of a cylindrical segment. The spherical portion 22 is attached to the lower rear of the main portion 14 of the hood by means of hinges 24. The hinge 24 passes through the apices of the spherical portion 22 of the guard and consists of rivets loosely formed so that the guard is free to move about the hinge means with very little resistance. Both portions of the guard are formed of transparent material, such as plastic or the like. The spherical portion 22 is a rather narrow spherical segment residing generally concentrically with the lower portion 16 of the hood and has a normally rearward edge 25 and a forward edge 26. The center of curvature lies midway between the sides of the hood 11 and on a line joining the two hinges 24. The cylindrical portion 23 of the guard is somewhat less than a semicircle in cross-section and its length is considerably more than the width of the spherical portion. The cylindrical portion has a forward edge 27 and a rearward edge 28. The rearward portion overlaps and is cemented to the forward edge of the spherical portion. In the portions where they are cemented together, the two portions have substantially the same transverse curvature. The size and arrangement of the parts is such that, when the rearward edge 25 of the spherical portion lies on a line between the hinges 24 and the rearward edge of the lower portion of the portion of the mask, the forward edge 27 of the cylindrical portion of the guard lies adjacent the lower edge of the window 18. Furthermore, when the guard is moved about the hinges 24 so that the guard lies mostly outside of the main portion of the mask, the edge 27 strikes the inside surface of the lower portion 16 at a position somewhat inward of the rear edge thereof; this means, of course, that the distance from the hinge line to the forward edge 27 of the guard is somewhat greater than the distance from the hinge line to the rearward edge of the lower portion 16.

The operation of the mask will be evident from the above description. The welder places the harness 12 over his head and, by adjusting the band 19, fastens it tightly thereto. The hinges 21 are tightened to the point where the friction is great enough to hold the hood 11 in any desired position relative to the face but not great enough to prevent rapid changes of such position. During normal welding, the hood is kept in a generally vertical position with the window 18 directly in front of the welder's eyes so that he can observe the welding flame or arc. In this position of the hood the guard lies in a generally angular position, as illustrated in the unbroken lines in Figure 2, with the rearward edge 25 resting against the welder's neck or upper chest. After a bead has been laid, the welder pushes the hood of the mask upwardly into the position illustrated in Figure 2 in broken lines; it remains in this position because of the friction in the hinge 21. However, since the hinges 24 are very loose and there is relatively little friction therein, the guard does not move upwardly with the hood. The hinges 24 travel slightly forwardly with the hood and carry with them the apices of the spherical portion of the guard. At the same time, the guard changes its angular position relative to the face of the welder slightly. The rearward edge 25 remains in its position of rest against the neck of the welder, however. The upward movement of the hood by the welder is continued until the rearward edge of the lower portion 16 of the hood strikes the forward edge 27 of the cylindrical portion of the guard, as is illustrated in broken lines in Figure 2. In this position, the welder can examine and work on the weld, his line of sight passing under and behind the rearward edge of the hood and through any cylindrical and spherical portions of the guard. His examination of the weld will take place mainly through the cylindrical portion, whereupon the appearance of the weld will be distorted very little, although he can also see through the spherical portion. An examination of the drawing will show that when the hood is in raised position, there are no gaps between the guard and the body for the entrance of flying scale and sparks. It can be seen that the welder does not have to concern himself with the positioning of the guard; he merely pushes the hood upwardly, as he does with the masks of the prior art, and the guard automatically positions itself properly. The fact that the forward edge of the guard strikes the lower, rearward edge of the hood means that there will never be a gap between the two for the admission of foreign matter.

While certain novel features of the invention have been shown and described and are pointed out in the annexed claims, it must be understood that various omissions, substitutions, and changes in the forms and details of the device illustrated and in its operation may be made by those skilled in the art without departing from the essence of the invention.

The invention having thus been described, what is claimed as new and desired to secure by Letters Patent is:

1. A welding mask, comprising: a head harness which is adjustable for affixing firmly to the head of the welder, a hood hingedly attached to said harness and having a front and sides terminating in a lower circular edge, the hood being adapted to cover the welder's face during normal welding operations, the hinged attachment having sufficient friction therein to hold the hood in a desired position relative to the harness, a window in said hood which registers with the direct line of sight of the welder when the hood is in a substantially upright position, and a transparent guard hingedly connected to the lower portion of the hood for movement within the hood about a transverse horizontal axis, the hinged connection between the guard and the hood being located at the sides of the hood and being substantially free of friction so that the guard remains in a downward position under the chin of the welder when the hood is moved upwardly about its line of attachment to said harness, the guard having an upper generally cylindrical section an edge of which is concentric with the circular lower edge of the hood, the diameter of the cylindrical section of the guard being greater than the diameter of the said circular lower edge of the hood whereby it strikes the hood adjacent the circular lower edge thereof when the said hood is moved to a raised position.

2. In a welding mask having a head harness and a hood hingedly connected to said harness, the hood having a front and sides terminating in a circular lower edge, the hood covering the welder's face during normal welding operations, a transparent guard hingedly attached within the hood to the lower portion of the sides of the hood for movement about a horizontal transverse axis and underlying the welder's chin for protection of the welder's face when the hood is in a slightly raised position, the guard lying within the hood and having an upper, generally cylindrical section an edge of which strikes the hood adjacent the circular lower edge thereof when the said hood is moved to the said raised position, the said edge of the guard being generally concentric with and of greater diameter than the said circular edge of the hood when said striking takes place.

3. Apparatus as recited in claim 2, wherein: the guard is also provided with a lower section having the shape of a spherical segment bounded by two arcs of the great circle.

4. Apparatus as recited in claim 3, wherein: the sides of the hood have edges away from the front of the hood which edges intersect the said circular lower edge, the said hinged connection is between the intersections of the boundary arcs of the lower section of the guard and the portion of the hood adjacent the intersection of the said edges of the sides and the said circular lower edge, and the upper edge of the spherical section is connected with a lower edge of the cylindrical section.

5. Apparatus as recited in claim 4, wherein: the distance from the said hinge axis to the center of the forward edge of the cylindrical section of the guard is greater than the distance from the said axis to the center portion of the lower, rearward edge of the hood.

6. In a welding mask having a head harness and a hood frictionally connected to the harness, the hood having a substantially cylindrical main portion which normally resides in an upright position and a lower portion having the shape of a spherical segment bounded by two arcs of the great circle and normally residing in a horizontal position underlying the chin of the welder, a transparent guard hingedly connected within the hood for movement about a horizontal transverse axis to a lower, rearward part of the said main portion of the hood, the said guard having a lower section which has the shape of a spherical segment bounded by two arcs of the great circle and an upper cylindrical section, the line of hinged connection between the guard and the hood passing through the generally common center of spheres defining the spherical section of the guard and the lower, spherical portion of the hood, the two aforementioned spherical portions being generally concentric, the upper cylindrical section of the guard having a lower edge which is connected to an upper edge of the lower section, the upper section of the guard striking and lying in concentricity with an edge of the spherical portion of the hood when the hood is in lifted position, thus limiting relative movement of the hood and guard.

References Cited in the file of this patent

UNITED STATES PATENTS

| | | |
|---|---|---|
| 2,262,449 | Bugeleisen | Nov. 11, 1941 |
| 2,277,090 | Feiler | Mar. 24, 1942 |
| 2,339,280 | Madson | Jan. 18, 1944 |
| 2,487,183 | Rohlf | Nov. 8, 1949 |
| 2,544,457 | Harrington | Mar. 6, 1951 |